Figure 1:
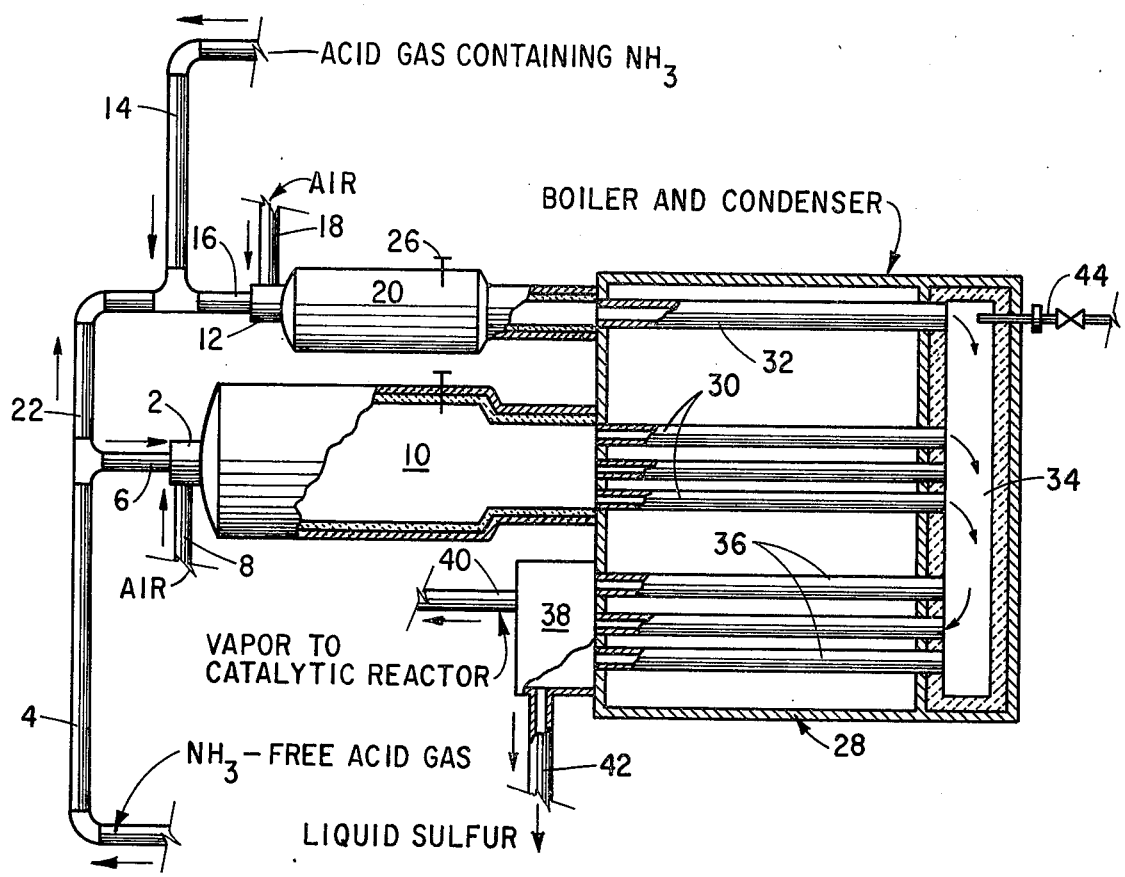

United States Patent [19]
Palm et al.

[11] 3,957,960

[45] May 18, 1976

[54] METHOD FOR RECOVERING SULFUR FROM AMMONIA-CONTAINING ACID GAS STREAMS

[75] Inventors: John W. Palm; Kay L. Berry, both of Tulsa, Okla.

[73] Assignee: Amoco Production Company, Tulsa, Okla.

[22] Filed: Dec. 23, 1974

[21] Appl. No.: 535,778

Related U.S. Application Data

[62] Division of Ser. No. 335,615, Feb. 26, 1973, Pat. No. 3,877,879.

[52] U.S. Cl............................. 423/573 G; 423/238
[51] Int. Cl.²........................................ C01B 17/04
[58] Field of Search.................. 423/573, 574, 238; 55/73

[56] References Cited
UNITED STATES PATENTS

| | | | |
|---|---|---|---|
| 3,026,184 | 3/1962 | Karaser............................. | 423/573 |
| 3,518,056 | 6/1970 | Klett................................... | 423/574 |
| 3,719,740 | 3/1973 | Larimore et al.................... | 423/574 |
| 3,819,816 | 6/1974 | Wunderlich et al................ | 423/573 |

FOREIGN PATENTS OR APPLICATIONS

| | | | |
|---|---|---|---|
| 686,469 | 1/1953 | United Kingdom................. | 423/573 |

*Primary Examiner*—G. O. Peters
*Attorney, Agent, or Firm*—Arthur McIlroy

[57] ABSTRACT

Refinery or similar streams containing $NH_3$ are processed in a sulfur plant having separate burners for the $NH_3$-containing acid gas stream and for the $NH_3$-free acid gas stream. A sampling device is provided for continuously or periodically sampling the combustion products from the unit burning the $NH_3$-containing gas. The $H_2S/SO_2$ ratios at this sample point and in the sulfur plant tail gas are used to control the operation of the system.

7 Claims, 2 Drawing Figures

METHOD FOR RECOVERING SULFUR FROM AMMONIA-CONTAINING ACID GAS STREAMS

This is a Division of our copending application Ser. No. 335,615, filed Feb. 26, 1973 now U.S. Pat. No. 3,877,879.

The present invention relates to the conversion of $H_2S$ to elemental sulfur. More particularly, it is concerned with the use of an $H_2S$-containing stream as a partial source of sulfur recovery plant feed wherein said stream has been derived, for example, from refinery processes involving the treatment of sulfur- and nitrogen-containing compounds with hydrogen.

BACKGROUND OF THE INVENTION

In many catalytic hydrogenation processes applied to hydrocarbon oils, shale oil, tar sands, etc., of which hydrocracking and hydrotreating or hydrodesulfurization are typical examples, $H_2S$ and $NH_3$ are produced as a result of reaction of hydrogen with sulfur compounds and nitrogen compounds contained in the oil. Sometimes, this conversion of one or the other or both of the sulfur and nitrogen compounds is the desired reaction, while in other cases it is merely an incidental reaction. Normally, in a typical process, liquid hydrocarbon oil containing nitrogen compounds and sulfur compounds and recycle hydrogen-rich gas and makeup hydrogen are passed through a reaction zone, usually containing a catalyst, at elevated temperature and pressure at which at least a portion of the hydrocarbons are vaporized; and there is obtained as a reaction zone effluent a mixture of vaporized hydrocarbons, hydrogen, $H_2S$ and $NH_3$. The effluent may also contain heavier hydrocarbons which are liquid at the reaction conditions. The reaction effluent is cooled to condense vaporized hydrocarbons, whereby the liquid hydrocarbons can be separated from the hydrogen-rich recycled gas, which is then reused in the hydrogen process.

When the reaction effluent contains both $H_2S$ and $NH_3$, it has been found that on cooling to temperatures below about 300°F, the $H_2S$ and the $NH_3$ may react to form salts which sometimes cause clogging problems in the heat exchangers and the lines. Injection of water into the reaction effluent upstream of the heat exchangers has been used to wash out such deposits and/or to prevent their formation. This water injection can provide a means of removing much of the ammonia formed if rather large amounts of water are injected sufficient to dissolve the ammonia.

While there are a number of known methods for separating mixtures of $NH_3$ and $H_2S$ from the aforesaid effluent, most of such methods involve scrubbing the gaseous phase produced in the hydrogenation step mentioned above with water. The resulting foul water stream contains primarily $H_2S$ and $NH_3$, both of which can be recovered from said foul water stream by subjecting the latter to steam stripping or the equivalent.

For conservation and ecological reasons, it is desirable to recover both $H_2S$ and $NH_3$ in useful form. Methods are known by which it is possible to separate the $NH_3$ from $H_2S$; however, in many instances, operators do not find it economically justifiable to do so and dispose of such mixtures of $H_2S$ and $NH_3$ as a partial feed stream to a sulfur recovery unit. Uncontrolled operation using a stream of this kind of mixed feed has let to difficulties because the conditions used for combustion of $H_2S$ to produce sulfur do not favor complete combustion of $NH_3$. Even if only relatively small quantities, e.g., 200 ppm of $NH_3$ remain in the combustion effluent gas which passes through the system, the presence of $NH_3$ in such amounts constitutes a hazard because of its ability to react with $SO_3$ to form ammonium sulfate at numerous locations in the plant and plug flow lines, seal pots, etc.

SUMMARY OF THE INVENTION

We have now discovered that sulfur plants using feed streams containing $NH_3$ can be operated smoothly by employing a separate muffle furnace for combustion of the $H_2S$-$NH_3$ mixture derived from the aforesaid foul water stream. This mixture generaaly constitutes from about 3 to about 30 volume percent of the total feed to the plant; however, the percentage may be even higher in some plants. A second and usually larger muffle furnace is used for combustion of the essentially $NH_3$-free $H_2S$ stream. This invention makes it possible to closely control the conditions for combustion of the ammonia, in order to achieve optimum combustion.

During operation the air rate to the burner in the first furnace is adjusted based on continuous or frequent sampling of the first burner effluent to determine the $H_2S/SO_2$ ratio. This, along with monitoring the $H_2S/SO_2$ ratio in the plant effluent, aids in maintaining the unit at optimum operating conditions. Generally, it is desirable to supplement the $H_2S$ in the $NH_3$-containing feed stream with $H_2S$ from the $NH_3$-free stream in order to maintain the desired temperature in the first muffle furnace. Because the sulfur and notrogen content of crudes used in refineries is often subject to wide variation, it will be apparent that both the amount and proportion of the $H_2S$ and $NH_3$ produced during hydrogenation of the crude can fluctuate substantially. These fluctuations contribute to the problems caused by incomplete combustion of the ammonia. Our invention overcomes these problems by maintaining a suitable atmosphere for combustion of the ammonia.

DESCRIPTION OF DRAWINGS AND A PREFERRED EMBODIMENT

Our invention will be further illustrated by reference to the accompanying drawings in which FIG. 1 is a combination diagrammatic and sectional view of an embodiment employing separate muffle furnaces that discharge into separate boiler sections, with a gas sampling line placed in direct communication with the discharge end of the boiler section taking combustion products from the smaller of the two furnaces.

Figure 2:
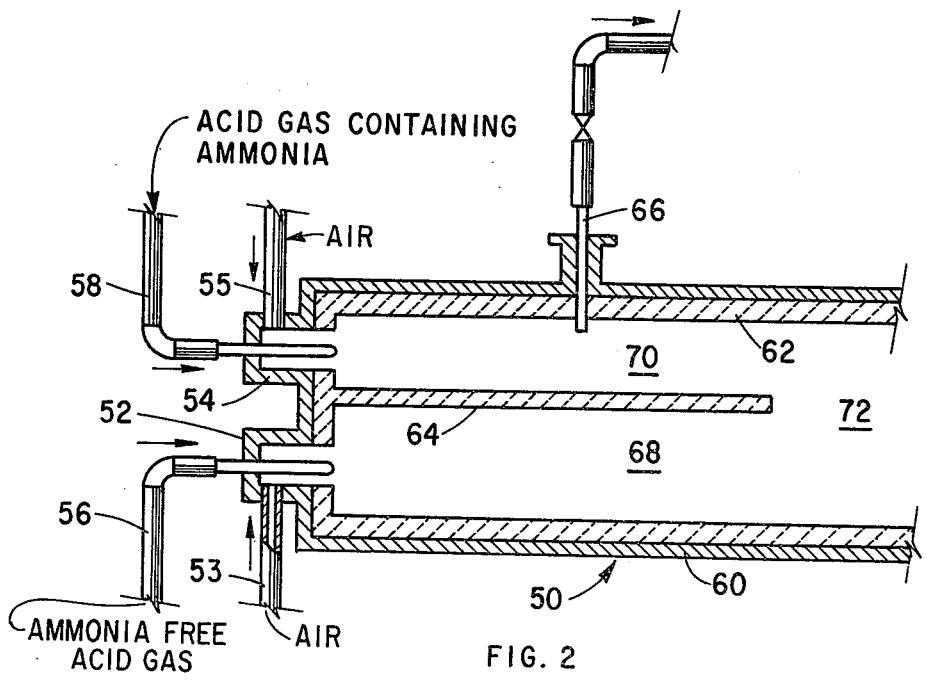

FIG. 2 illustrates another embodiment in which a single muffle furnace is equipped with two burners separated from one another by a refractory barrier or partition so that no substantial mixing of the combustion products therefrom occurs upstream of the sampling point.

In FIG. 1, $NH_3$-free acid gas is introduced into burner 2 via lines 4 and 6 and mixed with air entering through line 8. Combustion products exhaust into muffle furnace 10 producing a temperature therein in the range of about 2000° to 2600°F. The $NH_3$-containing $H_2S$ stream is sent to burner 12 via lines 14 and 16 where it is mixed with air entering by means of line 18. Typically, the latter stream contains about 33 mol % $NH_3$, 33 mol % $H_2S$, 33 mol % $H_2O$, and small amounts of hydrocarbons. In order to assure essentially complete combustion of $NH_3$ to $N_2$ and $H_2O$ in muffle furnace 20, the temperature therein should be maintained at a minimum of 2500° to 2600°F. We have found that, at temperatures of 2500°F and 2600°F, the amount of NH₃ in the furnace product is about 150 and about 80 ppm by volume, respectively—concentrations well within the permissible range. These temperatures can be employed without requiring a special refractory. Higher temperatures can, of course, be used but the refractory requirements are more severe. The temperatures existing in furnaces 10 and 20 are determined by means of indicators 24 and 26, respectively.

In instances where the $H_2S$ in line 14 is low and/or the water vapor content thereof is relatively high, we may divert additional $H_2S$ into the mixture being burned in burner 12, through lines 11, 22 and 16, to maintain the temperature required. The air rate in line 18 is controlled based on the composition of the gas at sample connection 44 so that a major portion of the $H_2S$ added through lines 14 and 22 is transformed into $SO_2$, and minimum concentrations of $NH_3$ and $SO_3$ are achieved.

In furnace 10 a substantial amount, e.g., 40 to 60% of the $H_2S$ is converted to sulfur. A smaller percent conversion to sulfur occurs in furnace 20. This sulfur along with water vapor, nitrogen, and unconverted $H_2S$ and $SO_2$ are discharged into a combination boiler and condenser unit, 28, maintained at a temperature of about 300° to about 400°F. The elemental sulfur produced in furnaces 10 and 20 is conducted through tubes 30 and 32, respectively, and then along with unreacted $H_2S$ and $SO_2$ is discharged into refractory lined chamber 34 and thereafter withdrawn therefrom via cooling tubes 36 located in the lower part of boiler 28. Tubes 36 discharge into chamber 38 where liquid product sulfur is separated from $H_2S$, $SO_2$, water vapor, and inerts which exit through line 40 while sulfur is removed by means of line 42.

If desired, the gases in line 40 may be preheated by any of several known methods to a reaction temperature of about 425° to 450°F and conducted to a series of catalytic reactors (not shown) where elemental sulfur is formed in a known manner.

In operation of the unit shown, it is important that the gases discharged from tubes 32 into chamber 34 be sampled and analyzed to determine the $H_2S/SO_2$ ratio. This is accomplished by periodically or continuously withdrawing a small stream from the upper part of chamber 34 via sample line 44. We have found that at an $H_2S/SO_2$ ratio of 0.086 the equilibrium ammonia content in the gas leaving muffle furnace 20 is less than one-third of the value which exists at an $H_2S/SO_2$ ratio of 2.0. However, the equilibrium $SO_3$ increases as the $H_2S/SO_2$ ratio is decreased. Periodically, the gas withdrawn through sample line 44 is analyzed for $NH_3$ and $SO_3$, as well as for $H_2S$ and $SO_2$, while the air rate in line 18 is varied. This will show the optimum $H_2S/SO_2$ ratio which should be maintained during continuous operation. The air rate in line 8 is controlled to maintain the $H_2S/SO_2$ ratio in the sulfur plant tail gas within the desired limits.

In FIG. 2, muffle furnace 50 is equipped with separate burners, 52 and 54, supplied, respectively, with $NH_3$-free acid gas in line 56 and with $NH_3$-containing acid gas in line 58. The furnace itself is constructed of a metal shell, 60, having on the interior thereof a refractory lining, 62. Significant mixing of combustion products from burners 52 and 54 is prevented by means of partition 64, which divides muffle furnace 50 into separate combustion zones 68 and 70. A sampling means, 66, is inserted into the furnace downstream of burner 54 in order to withdraw combustion products to determine whether the $NH_3$ fed to the system is being consumed to the proper extent. Downstream of sample point 66, the effluent from chamber 70 combines with the effluent from chamber 68 to permit formation of additional elemental sulfur in chamber 72.

An arrangement of the type shown in FIG. 2 results in a slightly greater conversion of $H_2S$ to sulfur in the combined furnaces, than occurs in the furnace arrangement of FIG. 1. The products of combustion are discharged from furnace chamber 72 directly into a conventional waste-heat boiler (not shown). Any suulfur liquefied at this stage can be withdrawn, the uncondensed effluent adjusted to a temperature of about 425° to 450°F, and the $H_2S$-$SO_2$ mixture contained therein converted over a bauxite or similar catalyst to free sulfur in a known manner.

We claim:

1. In a process for the recovery of free sulfur from dual $H_2S$-containing feed streams, one of which streams contains ammonia, the latter stream having been derived by first reacting with hydrogen a liquid hydrocarbon containing nitrogen compounds and sulfur compounds, scrubbing the resulting product gases with water to produce an aqueous solution of ammonia and $H_2S$ and liberating the $H_2S$ and ammonia from said solution by steam stripping or the equivalent to form a mixture of ammonia and $H_2S$, the improvement comprising burning of said streams in separate conbustion zones, the ammonia-containing stream being burned using an excess of air over that required to give an $H_2S/SO_2$ ratio of 2:1 while the ammonia-free stream is burned with a deficiency of air under that required to give an $H_2S/SO_2$ ratio of 2:1, sampling the combustion products produced by the burning of said ammonia-containing stream to determine the $H_2S/So_2$ ratio therein, maintaining the air supply in the burning of the ammonia-containing stream in an amount sufficient to produce an $H_2S/SO_2$ ratio in said combustion products ranging from about 0.085 to less than 2.0, adjusting the overall air supply to the process so as to maintain an $H_2S/SO_2$ ratio in the plant effluent of about 2:1, and discharging the combustion products from both of said zones into a boiler.

2. The process of claim 1 in which said ammonia-containing stream constitutes from about three to about 30 volume percent of the total feed to said combustion zones.

3. The process of claim 1 in which the ammonia-containing stream is burned at a temperature of about 2500°F to about 2600°F.

4. The process of claim 1 in which the $H_2S$-$SO_2$ ratio in combustion products produced by burning said ammonia-containing stream is about 0.086.

5. The process of claim 1 wherein the air supply in the burning of the ammonia-containing stream is present in an amount sufficient to produce combustion products containing from about 80 to 150 ppm of ammonia.

6. The process of claim 1 wherein the ammonia and $H_2S$ in the ammonia-containing stream are present in substantially equal amounts.

7. The process of claim 3 wherein the temperature range specified therein is maintained by diverting a portion of the $H_2S$ in the ammonia-free stream to said zone.

* * * * *

UNITED STATES PATENT OFFICE
CERTIFICATE OF CORRECTION

PATENT NO. : 3,957,960
DATED : May 18, 1976
INVENTOR(S) : John W. Palm and Kay L. Berry It is certified that error appears in the above-identified patent and that said Letters Patent are hereby corrected as shown below:

Column 2, line 13 "generaaly" should read --generally--;

line 30, "notrogen" should read --nitrogen--.

Column 3, line 13, "lines 11" should read --lines 4--.

Column 4, line 12, "suulfur" should read --sulfur--.

Signed and Sealed this

Seventh Day of September 1976

[SEAL]

Attest:

RUTH C. MASON
*Attesting Officer*

C. MARSHALL DANN
*Commissioner of Patents and Trademarks*